United States Patent
Bragulla et al.

(10) Patent No.: US 6,946,432 B2
(45) Date of Patent: Sep. 20, 2005

(54) ANTI-FOAMING PREPARATION AND USE THEREOF

(75) Inventors: Siegfried Bragulla, Monheim (DE); Peter Schwarz, Erkrath (DE)

(73) Assignee: Ecolab GmbH & Co. OHG, Dusseldorf (DE)

(*) Notice: Subject to any disclaimer, the term of this patent is extended or adjusted under 35 U.S.C. 154(b) by 176 days.

(21) Appl. No.: 10/149,148

(22) PCT Filed: Nov. 30, 2000

(86) PCT No.: PCT/EP00/12020

§ 371 (c)(1),
(2), (4) Date: Nov. 26, 2002

(87) PCT Pub. No.: WO01/41896

PCT Pub. Date: Jun. 14, 2001

(65) Prior Publication Data

US 2003/0151022 A1 Aug. 14, 2003

(30) Foreign Application Priority Data

Dec. 9, 1999 (DE) .......................... 199 59 311

(51) Int. Cl.⁷ ............................. C11D 1/72; C11D 3/36; B08B 3/04
(52) U.S. Cl. ..................... 510/272; 510/111; 510/179; 510/197; 510/219; 510/228; 510/238; 510/240; 510/420; 510/421; 510/435; 510/436; 510/467; 510/470; 134/25.2; 134/25.3; 134/39; 134/42
(58) Field of Search ............................ 510/111, 179, 510/197, 219, 228, 238, 240, 272, 420, 421, 435, 436, 467, 470; 134/25.2, 25.3, 39, 42

(56) References Cited

U.S. PATENT DOCUMENTS

| 3,294,693 | A |   | 12/1966 | Dupre et al. |
| 3,705,856 | A |   | 12/1972 | Sedliar et al. |
| 4,230,592 | A |   | 10/1980 | Miller et al. |
| 5,981,457 | A | * | 11/1999 | Ahmed ....................... 510/223 |
| 6,369,021 | B1 | * | 4/2002 | Man et al. ................... 510/466 |

FOREIGN PATENT DOCUMENTS

| DE | 39 28 602 | 3/1991 |
| EP | 0 202 638 | 11/1986 |
| EP | 0 326 795 | 8/1989 |
| EP | 0 716 180 | 6/1996 |
| FR | 2 093 790 | 1/1972 |
| GB | 2 000 176 | 1/1979 |
| WO | WO 91/03538 | 3/1991 |
| WO | WO 93/04361 | 3/1993 |

* cited by examiner

Primary Examiner—Brian P. Mruk
(74) Attorney, Agent, or Firm—Merchant & Gould P.C.

(57) ABSTRACT

The anti-foaming preparations comprise aqueous formulations, which contain at least one substance, from the group of polyhydroxy compounds, non-ionic detergents and phosphoric acid esters and their salts, preferably alkyl polygluocosides, alkoxylated long-chain alcohols and an alkali salt of a phosphoric acid partial-ester. The particular advantage of said aqueous formulations is that they are stable when included in highly alkaline cleaning concentrates.

22 Claims, No Drawings

ANTI-FOAMING PREPARATION AND USE THEREOF

The present invention describes formulations and the use of these formulations in highly alkaline cleaners, in particular for suppressing the formation of foam during the cleaning process.

In order to clean plants, equipment and containers in the food industry, strongly alkaline cleaning solutions are often used in order to remove residues, in particular fat and protein residues, from the surfaces of the plants and containers. In the so-called cleaning-in-place (CIP) process, cleaning solutions are usually circulated by pump and, for example, for the effective cleaning of tanks, sprayed by means of spray heads which are already installed in the tank. The flow rate here is, on average, 1.5 to 4 m/sec. The cleaning solutions which have already been used are often collected in order to be able to reuse them in the next cleaning process. More and more dissolved soil residues accumulate in these stored cleaning solutions, which may lead to increased foam formation. In other cases, the cleaning solutions comprise foaming constituents from the outset, such as, for example, anionic surfactants. Particularly for the process of CIP cleaning, foam is troublesome, making it necessary to reduce, and as far as possible to prevent, the formation of foam by adding foam-suppressing formulations. The foam-suppressing formulations can here be added directly to the diluted cleaning solution, although in many cases it is preferable to incorporate the foam-suppressing formulations into the cleaners from which, for commercial cleaning, the cleaning solutions are prepared by dilution with water. However, difficulties which arise due to the incompatibility of most foam-suppressing formulations with highly concentrated cleaners are often evident. Very particular difficulties arise when readily antifoaming formulations are incorporated into highly alkaline solutions which consist essentially of concentrated alkali metal hydroxide solution. Only a few groups of substances which have adequate chemical resistance to concentrated aqueous alkali, such as, for example, alkoxylated alcohols, are suitable for this purpose in the first place. Taken in isolation, these foam-suppressing compounds do not dissolve in concentrated alkali metal hydroxide solutions to give clear solutions and cannot be incorporated into said solutions in a homogeneous manner. Only the addition of auxiliaries, such as alkyl polyglucosides and other solubilizing substances, as are described, for example, in patent applications EP 202 638 and WO 91/03538, has lead to an improvement. However, this always requires very large amounts of solubilization auxiliaries, and the solution found was in most cases only effective for individual foam-suppressing compounds of this type, or the antifoaming effectiveness of the resulting cleaner was no longer adequate due to the high amounts of required auxiliaries, such as alkyl polyglucosides. The object of the present invention is to develop a further improvement. The aim was to find a highly effective antifoaming formulation of simple composition which satisfies all ecological and toxicological requirements for use in the food sector and which can also be stably incorporated into high-concentration alkali metal hydroxide solutions.

The invention provides antifoaming formulations or preparations which are suitable for providing a stable highly alkaline-aqueous cleaner with a content of more than 20% by weight of alkali metal hydroxide, based on the total weight of the cleaner, where the preparation comprises at least one substance chosen from each of the groups of
a) polyhydroxy compounds
b) nonionic surfactants and
c) phosphoric esters and salts thereof,
preferably more than 25% by weight and in particular more than 40% by weight, of alkali metal hydroxide, based on the total weight of the cleaner. Preferably,
a) the cleaners remain stable upon storage for 360 days at temperatures of from 40° C. and preferably also at −5° C., and particularly preferably also at 20° C., without separating and
b) are able, in 2% strength by weight aqueous use solution, the solution being prepared using water with 0° German hardness, to keep the foam height to below 100 ml when 3 ml of standard foamer are added in the test in accordance with DIN 53902 Part 1 at temperatures of 60° C.

The test procedure involves adding 200 ml of test solution at 60° C. to a 1 l measuring cylinder. 3 ml of the standard foamer are added to the solution. This standard foamer is based on whole milk saponified with NaOH. Foam is then generated by beats with a constant frequency of 60 beats/min, the beating punch being moved at constant speed and the beating surface used being a perforated disk, which is described in DIN 53902 Part 1, the perforated disk being immersed 4 cm into the solution during beating.

As has already partly been discussed, the formulations or preparations according to the invention advantageously comprise at least one substance chosen from each of the groups of
a) polyhydroxy compounds, including preferably at least one alkyl polyglucoside, where the alkyl polyglucoside preferably has 8 to 16 carbon atoms in the alkyl group and 1 to 5 glucose units, and
b) nonionic surfactants, including preferably at least one alkoxylated alkyl alcohol having 8 to 22 carbon atoms in the alkyl chain, where, in particular, at least one compound from the groups of mixed ethoxylates/propoxylates or branched or unbranched alkyl alcohols having 8 to 22 carbon atoms in the alkyl chain and of the terminally capped ethoxylates of branched or unbranched alkyl alcohols having 8 to 22 carbon atoms in the alkyl chain is present, and very particularly preferably at least one compound from the groups of ethoxylated and propoxylated alkyl alcohols having 12 to 22 carbon atoms in the alkyl moiety, of the butyl ethers of ethoxylated alkyl alcohols having 12 to 22 carbon atoms in the alkyl moiety and methyl ethers of ethoxylated alkyl alcohols having 12 to 22 carbon atoms in the alkyl moiety is present, where, in the specific case, butyl ether and methyl ether of the ethoxylated 2-octyl-1-dodecanol are preferred, and
c) phosphoric esters and salts thereof, including preferably at least one salt of a phosphoric partial ester, where at least one alkali metal salt of a phosphoric partial ester of alkoxylated alkylphenol is particularly preferably present, where
the formulations according to the invention preferably comprise 1 to 30% by weight and particularly preferably 2 to 20% by weight of at least one substance chosen from each of the described groups a) to c) and in a very particularly preferred embodiment the components (a):(b):(c) are present in a weight ratio of (1 to 2):(2 to 3):(1 to 2) in the formulations according to the invention.

The formulations according to the invention preferably additionally comprise at least one component which can be detected by ion-selective determination where this is particularly preferably a halide, in particular an alkali metal halide, such as, for example, sodium chloride, potassium chloride or sodium iodide or potassium iodide, and in a very particularly preferred embodiment the concentration of the component which can be detected by ion-selective determination is between 0.01 and 2% by weight, based on the total formulation.

The formulations according to the invention and the highly alkaline cleaners obtainable therefrom are preferably in the form of an aqueous solution, where, in a particularly preferred embodiment, gel-like or pasty formulations or cleaners are also obtainable.

The formulations according to the invention also dissolve in high-concentration aqueous alkali metal hydroxide solutions to form clear solutions in amounts as are required for the effective defoaming of the dilute cleaning solutions prepared from these alkali metal hydroxide solutions in the food sector. This solubility in alkali is not only given for individual foam-suppressing compounds, but extends to the entire range of foam-suppressing alkoxylated long-chain alcohols. It is of course, however, also possible not to mix the formulations according to the invention with concentrated alkali metal hydroxide solution, but to add them directly to the cleaning solution diluted to the use concentration. It is particularly advantageous that the total amount of solubilizing additives in the formulations according to the invention can remain relatively low, so that disturbances of the foam-suppressing action by the solubilizing additives are not observed.

The alkyl polyglucosides preferably present in the formulations according to the invention are prepared on an industrial scale by condensation of fatty alcohols with glucose or polyglucose and are commercially available in various variants. Examples of alkyl polyglucosides which are particularly suitable for the use according to the invention are the products Glukopon® 600 from Henkel and Triton® BG10 from Röhm & Haas. Nonionic surfactants which are particularly suitable for the preparation of the formulations according to the invention are, for example, Plurafac® LF 403, Plurafac® 431 from BASF, and Dehypon® LT 104 and Dehypon® G 2084 from Henkel.

The phosphoric esters are surface-active substances which are preferably derived from long-chain aliphatic or araliphatic alcohols. The salts of phosphoric partial esters, and here in particular those of alkoxylated alkylphenols, have proven particularly suitable. Preference is given to using the sodium and potassium salts as alkali metal salts, of which particular preference in turn is given to the potassium salts. Phosphoric partial esters with a surfactant action as are preferably used according to the invention are available commercially. One example of an active ingredient of this type which can be used particularly readily according to the invention is the product Triton® H 66 (Röhm & Haas). The constituents a) and c) are preferably in the weight ratio 1:1 to 1:10 in the formulations according to the invention.

In addition to the above described constituents a, b and c, the formulations according to the invention comprise only water in the simplest case. The co-use of further customary auxiliaries for such surface-active aqueous preparation is, however, not excluded. Thus, additional solubilizers which may be present are short-chain aromatic sulfonates, such as, for example, cumenesulfonate, xylenesulfonate and toluenesulfonate in amounts up to about 5% by weight, preferably between about 0.1 and about 2% by weight.

To prepare the formulations according to the invention, the procedure is preferably as follows: Component a) is dissolved in water to give a clear solution. Component c) is then dissolved to give a clear solution. Component b) is dissolved as the last component with further stirring to give a clear solution. This finished formulation can be added in amounts of from 0.1 to 40% by weight, preferably 1 to 10% by weight, based on the total cleaner, to liquid alkali metal solutions with a content of, preferably, more than 20% by weight, particularly preferably more than 50% by weight and very particularly preferably more than 70% by weight, of alkali metal hydroxide, based on the total cleaner, with stirring.

The invention further provides a cleaner based on concentrated alkali metal hydroxide solution which comprises 1 to 30% by weight of the formulation or preparation according to the invention, based on the total cleaner, optionally together with further active ingredients and additives. In this connection, concentrated alkali metal hydroxide solution is understood as meaning an alkali metal hydroxide solution with 20 to 80% by weight, although these guide values are not to be regarded as obligatory for the invention. The remainder to 100% by weight is made up of water.

The cleaners according to the invention preferably
a) remain stable upon storage over 360 days at temperatures of 40° C., without separating and
b) are able, in a 2% strength by weight aqueous use solution, the solution being prepared using water with 0° German hardness, to keep the foam height below 100 ml when 3 ml of standard foamer are added in the test in accordance with DIN 53902 Part 1 at temperatures of 60° C.

The present invention further provides for the use of the cleaners according to the invention in cleaning processes which, if using customary cleaners, could not be carried out without the separate addition of antifoaming components over the course of the cleaning process due to the amounts of foam which would otherwise form, without the need for the addition of antifoaming components over the course of the cleaning process. The cleaners according to the invention are preferably diluted for use with water to 0.05 to 6% by weight, based on the total cleaning solution, and used particularly preferably in cleaning processes in the food industry, in particular in the drinks industry for bottle cleaning or in the milk industry for CIP cleaning, and also in the pharmaceutical or cosmetics industry. In a particularly preferred embodiment of the use according to the invention, the addition of additional antifoam during the cleaning processes can be dispensed with entirely.

The use of the formulation or antifoaming preparation according to the invention can either involve adding the inventive formulation directly to the cleaning solution adjusted to the use concentration, or else, with particular advantage, incorporating the formulation according to the invention into the concentrate, i.e. the cleaner from which the cleaning solution to be applied is only later prepared by dilution with water.

In the simplest case, the cleaners obtainable from the formulations according to the invention comprise only water in addition to alkali metal hydroxide and the customary constituents of the formulations according to the invention. In most cases, however, further active ingredients, such as complexing agents, such as, for example, salts of organophosphonic acids, for example nitrilotrimethylenephosphonic acid, salts of amino-acetic acids, such as, for example, methylglycine-diacetic acid or salts of hydroxycarboxylic acids, in particular of citric acid and/or lactic acid, and polycarboxylic acids or salts thereof, such as, for example, polyacrylates or polyaspartic acid, are also present. Such complexing agents may be present in the cleaners in amounts up to about 20% by weight, preferably in amounts between about 1 and about 10% by weight. Further optional constituents of such alkaline cleaner concentrates which can be used in the food sector are gluconic acid or phosphonobutanetri-carboxylic acid in amounts of from 1 to 5%.

The advantage of the formulations and processes according to the invention is that mixtures which are soluble to form clear solutions, can be incorporated homogeneously and are stable over a long period in concentrated alkali metal hydroxide solutions and which have a very good antifoaming profile are made available without the need for excessively large amounts of auxiliaries, such as alkyl polyglucosides and other solubilizing substances, as are described, for example, in patent applications EP 202 638 and WO 91/03538.

EXAMPLES

Examples of formulations according to the invention are given in Table 1 as Example 1 and Example 2.

TABLE 1

Examples of formulations according to the invention:

| Constituents | Example 1 | Example 2 |
|---|---|---|
| Alkyl polyglucoside (Triton ® BG 10) | 4.2% | 4.2% |
| $C_{12}$—$C_{18}$-Fatty alcohol + EO + PO (Plurafac ® LF 403) | 5.0% | 6.0% |
| Alkylarylalkoxyphosphate potassium salt (50%) (Triton ® H 66) | 3.55% | 3.5% |
| Water | 87.25% | 86.3% |
| Total | 100.0% | 100.0% |

For the preparation, the following procedure was used: The water was initially introduced into a stirred container. Then, Triton BG 10, Triton H 66 and, finally, Plurafac LF 403 were completely dissolved with slow stirring.

By mixing formulations according to the invention or constituents thereof with alkali metal hydroxide solution, it is possible to obtain stable highly alkaline cleaners. Examples of such mixtures are given in Table 2 as Example 3 and Example 4.

The mixtures of Examples 1 and 2 were each mixed in an amount of 10% by weight with 90% by weight of 50% strength NaOH slowly with stirring until a homogeneous mixture formed. Experiments to determine the antifoaming properties were carried out with the inventive mixtures according to Examples 3 and 4 and the Comparative Examples 1, 2, 3, 4 and 5.

The experiment was carried out at 60° C. with a 2% strength solution of the formulations according to Examples 3 and 4 and the Comparative Examples 1, 2, 3, 4 and 5 in softened water in the test in accordance with DIN 53902 Part 1 at 60° C. with the addition of 2 ml of a foaming impurity. The foaming impurity used was saponified whole milk. The lower the resulting foam volume, the better the antifoaming effectiveness of the antifoam. The results of this experimental series are given in Table 2.

In addition to the experiments for determining the antifoaming properties, the stability of the highly alkaline formulations was also investigated. For this, the mixtures corresponding to Examples 3, 4 and the Comparative Examples 1, 2, 3, 4 and 5 6 were stored in sealed glass vessels at −5° C., 20° C. and 40° C. and checked weekly for any visual changes in the mixtures. The results of this experimental series are likewise given in Table 2.

TABLE 2

Examples of the antifoaming effectiveness of highly alkaline cleaners:

| Constituents | E. 3* (%) | E. 4* (%) | C. 1** (%) | C. 2** (%) | C. 3** (%) | C. 4** (%) | C. 5** (%) |
|---|---|---|---|---|---|---|---|
| Alkyl polyglucoside (Triton ® BG 10) | 0.42 | 0.42 | 0.50 | 0.42 | 0 | 0.55 | 0.42 |
| $C_{12}$—$C_{18}$-Fatty alcohol + EO + PO (Plurafac ® LF 403) | 0.50 | 0.60 | 0 | 0.45 | 0 | 0.30 | 0.60 |
| Alkylarylalkoxyphosphate potassium salt (50%) (Triton ® H 66) | 0.36 | 0.35 | 0 | 0 | 0 | 0 | 0 |
| NaOH | 45 | 45 | 45 | 45 | 45 | 45 | 45 |
| Water | 53.72 | 53.63 | 54.2 | 54.13 | 55 | 54.15 | 53.98 |
| Total | 100.0 | 100.0 | 100.0 | 100.0 | 100.0 | 100.0 | 100.0 |
| Antifoaming effectiveness | | | | | | | |
| Foam height in the foam test | 90 | 80 | 280 | 140 | 350 | 420 | 180 |
| Stability test*** | | | | | | | |
| At −5° C. | >50 w | >50 w | >50 w | 20 w | >50 w | >50 w | 10 w |
| At 20° C. | >50 w | >50 w | >50 w | 20 w | >50 w | >50 w | 2 w |
| At 40° C. | >50 w | >50 w | >50 w | 10 w | >50 w | >50 w | 1 w |

*E = Abbreviation for examples according to the invention
**C = Abbreviation for comparative examples
***w = Abbreviation for weeks

What is claimed is:

1. An antifoaming preparation which is suitable for providing a stable highly alkaline-aqueous cleaner comprising more than 40% by weight of alkali metal hydroxide, based on the total weight of the cleaner, the antifoaming preparation comprising
   a) at least one alkyl polyglucoside;
   b) at least one alkoxylated alkyl alcohol having 8 to 22 carbon atoms in the alkyl chain; and
   c) at least one salt of a phosphoric partial ester of alkoxylated alkylphenol.

2. The preparation as claimed in claim 1, wherein the content of alkali metal hydroxide in the resulting cleaner is greater than 70% by weight, based on the total weight of the cleaner.

3. The preparation as claimed in claim 1, wherein the constituent b) is at least one compound from the group of mixed ethoxylates/propoxylates of branched or unbranched alkyl alcohols having 8 to 22 carbon atoms in the alkyl chain and of the group of terminally capped ethoxylates of branched or unbranched alkyl alcohols having 8 to 22 carbon atoms in the alkyl chain.

4. The preparation as claimed in claim 3, wherein the constituent b) represents at least one compound from the group of ethoxylated and propoxylated alkyl alcohols having 12 to 22 carbon atoms in the alkyl moiety, group of butyl ethers of an ethoxylated alkyl alcohol having 12 to 22 carbon atoms in the alkyl moiety and group of methyl ethers of an ethoxylated alkyl alcohol having 12 to 22 carbon atoms in the alkyl moiety.

5. The preparation as claimed in claim 1, wherein the component a) is at least one alkyl polyglucoside having 8 to 14 carbon atoms in the alkyl group and 1 to 5 glucose units.

6. The preparation as claimed in claim 1, wherein based on the total preparation, the constituents are present in the following amounts:
a) 1 to 30% by weight and
b) 1 to 30% by weight and
c) 1 to 30% by weight.

7. The preparation as claimed in claim 6, wherein based on the total based on the total preparation, the constituents are present in the following amounts:
a) 2 to 20% by weight and
b) 2 to 20% by weight and
c) 2 to 20% by weight.

8. The preparation as claimed in claim 1, wherein the constituents (a):(b):(c) are present in a weight ratio of (1 to 2):(2:3):(1 to 2).

9. The preparation as claimed in claim 1, wherein at least one component which can be detected by ion-selective determination is additionally present.

10. The preparation as claimed in claim 9, wherein the component which can be detected by ion-selective determination is a halide.

11. The preparation as claimed in claim 9, wherein the component which can be detected by ion-selective determination is present in a concentration of from 0.01 to 2% by weight, based on the total preparation.

12. A cleaner, which based on the total cleaner, comprises
A) 1 to 30% by weight of an anti-foaming preparation comprising:
a) at least one alkyl polyglucoside,
b) at least one alkoxylated alkyl alcohol having 8 to 22 carbon atoms in the alkyl chain, and
c) at least one salt of a phosphoric partial ester of alkoxylated alkylphenol; and
B) more than 40% by weight of alkali metal hydroxide.

13. The cleaner according to claim 12, further comprising further active ingredients and additives.

14. A method for using a cleaner comprising:
cleaning with the cleaner in a cleaning operation where foaming is troublesome, the cleaner comprising:
A) 1 to 30% by weight of an anti-foaming preparation comprising:
a) at least one alkyl polyglucoside,
b) at least one alkoxylated alkyl alcohol having 8 to 22 carbon atoms in the alkyl chain, and
c) at least one salt of a phosphoric partial ester of alkoxylated alkylphenol; and
B) more than 40% by weight of alkali metal hydroxide.

15. The method according to claim 14, wherein the cleaner is diluted for use to 0.05 to 6% by weight, based on the total cleaning solution.

16. The method according to claim 14, wherein the cleaning operation comprises a cleaning process in the food industry.

17. The method according to claim 16, wherein the cleaning operation comprises bottle cleaning.

18. The method according to claim 14, wherein the cleaning operation comprises CIP cleaning.

19. The method according to claim 14, wherein the cleaning operation comprises a cleaning process in the pharmaceutical or cosmetics industry.

20. The method according to claim 14, wherein the cleaning operation comprises no addition of antifoams to the cleaner.

21. A cleaner, which based on the total cleaner, comprises
A) 1 to 10% by weight of an anti-foaming preparation comprising:
a) at least one alkyl polyglucoside,
b) at least one alkoxylated alkyl alcohol having 8 to 22 carbon atoms in the alkyl chain, and
c) at least one salt of a phosphoric partial ester; and
B) more than 70% by weight of alkali metal hydroxide.

22. The preparation as claimed in claim 21, wherein the constituent c) is at least one alkali metal salt of a phosphoric acid partial ester of alkoxylated alkylphenol.

* * * * *